(12) United States Patent
Yekutiely et al.

(10) Patent No.: US 6,893,005 B2
(45) Date of Patent: May 17, 2005

(54) TENSING A FLEXIBLE FLOATING COVER

(76) Inventors: David Yekutiely, 24 Sheshet Hayamim St., Ramat HaSharon 47247 (IL); Barak Yekutiely, 1278 Wellington Ave., Teaneck, NJ (US) 07666

( * ) Notice: Subject to any disclaimer, the term of this patent is extended or adjusted under 35 U.S.C. 154(b) by 123 days.

(21) Appl. No.: 10/615,922

(22) Filed: Jul. 10, 2003

(65) Prior Publication Data
US 2005/0005546 A1 Jan. 13, 2005

(51) Int. Cl.⁷ .............................................. B65D 1/50
(52) U.S. Cl. ...................................... 254/275; 254/277
(58) Field of Search ................................ 254/275, 277

(56) References Cited

U.S. PATENT DOCUMENTS

| | | | |
|---|---|---|---|
| 4,853,984 A | * | 8/1989 | Celiano .......................... 4/496 |
| 4,939,798 A | * | 7/1990 | Last ............................... 4/502 |
| 2002/0046817 A1 | * | 4/2002 | Last ............................ 160/133 |
| 2002/0062602 A1 | * | 5/2002 | Pearlson et al. ................ 52/66 |
| 2003/0090124 A1 | * | 5/2003 | Nolan et al. ................... 296/98 |

* cited by examiner

Primary Examiner—Emmanuel Marcelo
(74) Attorney, Agent, or Firm—Dekel Patent Ltd.; David Klein

(57) ABSTRACT

Apparatus comprising a tensing element connected at one end thereof to a supporting structure and at another end thereof to a cover, wherein movement of the cover imparts a force on the tensing element, an actuator adapted to move the tensing element, and a sensing device adapted to sense an equilibrium force position of the tensing element, wherein if the force changes the equilibrium force position the sensing device instructs the actuator to change a tension imparted by the tensing element on the cover.

9 Claims, 1 Drawing Sheet

TENSING A FLEXIBLE FLOATING COVER

FIELD OF THE INVENTION

The present invention relates generally to flexible covers, such as flexible covers for reservoirs, and particularly to apparatus and methods for tensing such flexible covers.

BACKGROUND OF THE INVENTION

Floating covers are a very economical method of protecting precious water. The cost can be 20% of that for other cover options. Industry-recognized guidelines exist for the design, installation and maintenance of floating cover systems. An example is the American Waterworks Association (AWWA) standard D130-87, which contains the most current standard practices observed for system compliance to US national health and safety regulations. The California-Nevada Section American Water Works Reservoir Floating Cover Guidelines dated March 1999 offers an excellent source of design, operations and maintenance guidelines.

Properly designed reservoir-floating cover systems prevent fluid loss due to evaporation, reduce chemical demand and improve water quality by preventing contamination from bird droppings, airborne particulates, dead animals, pollen and other pollutants. Floating covers block off sunlight preventing algae bloom. They also reduce the production of trialomethane (THM) type compounds such as chloroform from forming that result from the combining of organic substances with chlorine due to reductions in chlorine demand.

Floating cover systems were introduced over 30 years ago. Many have provided a service life beyond 20 years. When first introduced, materials and designs were not developed and in some cases had limited success. Today, with advancements in design and materials, floating covers offer the low cost quality solution of choice where water quality standards require potable water reservoirs be covered.

Floating cover applications range from anaerobic digestion covers for wastewater systems, to potable water reservoir covers for municipal drinking water applications. In farming applications they have been successfully used with enzymes to capture methane gas that is used to fuel electricity producing generators that can satisfy 150% of a typical swine farm's electrical power requirements. This alternative generates renewable "green energy" from an otherwise polluting system that provides zero return on investment.

Floating cover systems offer the best performance when they are constructed with a polyester fabric reinforced "geomembrane" such as HYPALON® or polypropylene. Reinforced cover membranes with United States National Sanitation Foundation Standard No. 61 (NSF-61) approval for contact with drinking water are often encountered in thicknesses of 0.91 mm to 1.14 mm, and are engineered and manufactured to survive the effects of weathering for 20–30 years.

The superior strength of high performance reinforced "geomembranes" enables safe and easy access onto the cover for inspection and repair personnel. The geomembrane is designed to float on liquids or semi-liquid substances and will usually perform one or more of the following functions:

Thermal insulation.
Ultraviolet light insulation.
Encapsulation to create an anaerobic (oxygen less) environment.
Gas containment
Odor control The overall physical demands of a floating cover are typically greater than any other application of a geomembrane due to the dynamic forces generated by wind uplift, gas buoyancy etc. Seams are usually very frequent (typically being prefabricated) and are particularly vulnerable to the imposed tensile stresses. Furthermore the encapsulated contaminants often generate extreme chemical conditions.

Floating cover systems require site specific planning and design to be successful. Floating covers must be designed to rise and fall with varying reservoir water levels and have drainage systems for the removal of storm water. Depending upon site, storm water can be conducted through a reservoir and drained to the outside by way of gravity flow or removed from the cover via electrical pumps and discharge hoses. Reservoir access is maintained by the installation of hatches.

There are essentially two types of water-tight floating cover systems commonly specified for drinking water storage applications: a weight tensed defined sump style (such as the commercially available BURKE® style) and a mechanically tensed style (such as the commercially available REVOC® style). Weight tensed defined sump covers use a combination of floats and weights to affect tension and surface geometry. The geometry is controlled in such a manner that strategically located drainage channels or sumps are formed for the collection of storm water. Storm water is conducted through the sump channels to either gravity drains or sump pumps for removal. Mechanically tensed (e.g., REVOC®) type systems use spring or weight loaded cable tension to achieve definition and stability in the cover. As seen in FIG. 1, a REVOC® style floating cover system consists of tensing elements 1 attached to a cover material 2 at specific intervals all around the reservoir's perimeter. The mechanically tensed portion of the cover is thus held into place and becomes a defined plate that is protected from wind uplift and drifting. The outer cover perimeter is relaxed and forms a sump where storm water can be diverted off of the cover through a drainage system. The cover geomembrane material makes direct contact with the top of the water without additional floats for buoyancy. The REVOC® cover system requires less maintenance and lower cover membrane replacement costs and is generally considered a superior system in cold weather applications. Both types of floating covers may be watertight and designed to function at all water levels.

Properly installed floating covers of open water reservoirs should exert minimal stress forces on the cover material to maintain definition and stability. However, floating cover systems should be designed with sufficient slack to accommodate fluctuations in the level of reservoir contents. Some existing methods of floating cover systems (e.g., the REVOC® type systems) consist of tensing elements attached to the cover's interior at specific intervals all around the reservoir's perimeter. These systems use spring or weight loaded cable tension to achieve definition and stability in the cover. As the water levels fluctuate between the minimum and maximum levels, these purely mechanical tensioners have some major weaknesses including very limited cable length and inducing unequal and unnecessary stresses on the cover material.

SUMMARY OF THE INVENTION

The present invention seeks to provide improved apparatus and methods for tensing flexible covers, such as those used for open water reservoirs. The invention may provide a tensing cable system that is a simple, effective, and low-cost solution for basically all types of flexible membrane floating cover applications. The invention may provide an active electronic cable tensing system with unlimited fluctuation range while holding a constant and minimal force on the cover material at each cable interface.

Floating covers of the present invention may be capable of automatically adjusting to forces exerted on them by either static loads (such as an inactive weight) or dynamic loads (walking person). The weight of theses loads is buoyed up by a force equal to the weight of the water displacement, thereby redistributing the load into a uniform pattern of minimum stress.

There is thus provided in accordance with an embodiment of the present invention apparatus comprising a tensing element connected at one end thereof to a supporting structure and at another end thereof to a cover, wherein movement of the cover imparts a force on the tensing element, an actuator adapted to move the tensing element, and a sensing device adapted to sense an equilibrium force position of the tensing element, wherein if the force changes the equilibrium force position the sensing device instructs the actuator to change a tension imparted by the tensing element on the cover.

In accordance with an embodiment of the present invention if the force is greater than the equilibrium force position the sensing device instructs the actuator to reduce tension imparted by the tensing element on the cover until equilibrium is reached, and conversely, if the force is less than the equilibrium force position the sensing device instructs the actuator to increase tension imparted by the tensing element on the cover until equilibrium is reached.

Further in accordance with an embodiment of the present invention the sensing device instructs the actuator to change the tension imparted by the tensing element on the cover until the cover is at a predefined height relative to the tensing element.

Still further in accordance with an embodiment of the present invention the actuator is suspended on a cable by means of a biasing device. The force may change a position of the actuator relative to the biasing device.

In accordance with an embodiment of the present invention the sensing device comprises a plurality of limit switches. The cover may comprise a floating cover and/or a geomembrane. The tensing element may be connected to the cover by means of an elastic connecting member. The tensing element may be connected to the supporting structure via a ball joint.

BRIEF DESCRIPTION OF THE DRAWINGS

The present invention will be understood and appreciated more fully from the following detailed description taken in conjunction with the appended drawings in which.

DETAILED DESCRIPTION OF A PREFERRED EMBODIMENT

Figure 1:
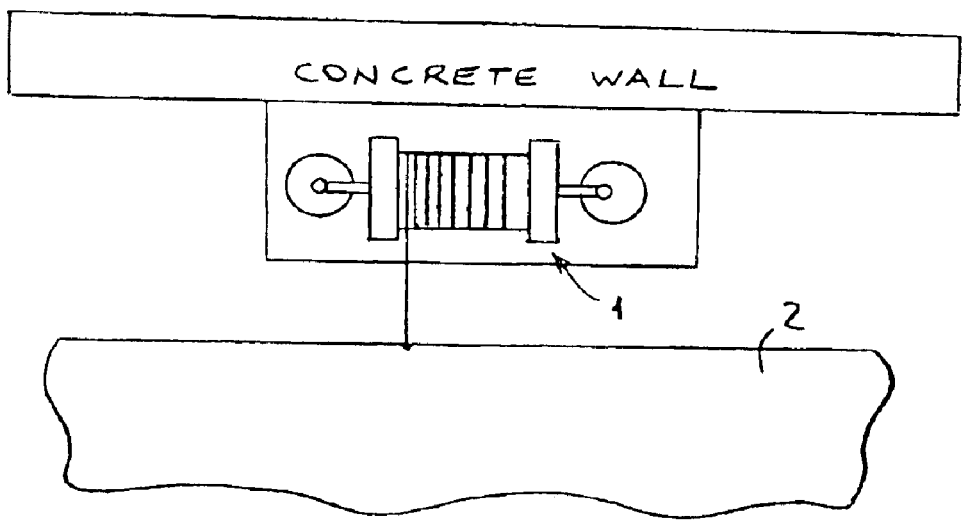
FIG. 1 is a simplified illustration of a tensing element used in a floating cover system of the prior art.
Figure 2:
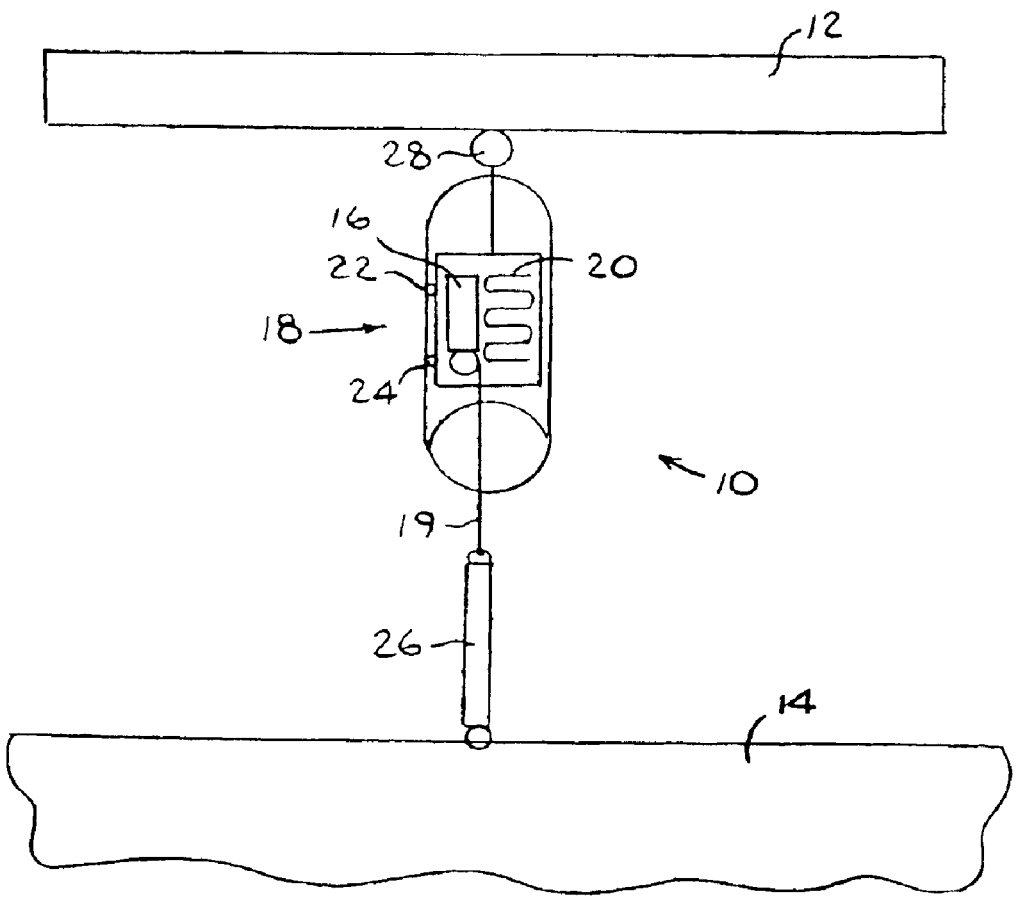
FIG. 2 is a simplified illustration of a tensing element constructed and operative in accordance with an embodiment of the present invention.

Reference is now made to FIG. 2, which illustrates a tensing element 10, constructed and operative in accordance with an embodiment of the present invention. Tensing element 10 may be connected at one end thereof to some supporting structure 12, such as but not limited to, a concrete wall, and at another end thereof to a cover 14. Cover 14 may comprise without limitation any kind of floating cover or geomembrane, for example. Tensing elements 10 may be connected all around the perimeter of cover 14 or a portion of the perimeter.

An actuator 16 may be provided for moving tensing element 10. A sensing device 18 may be provided that senses an equilibrium force position of tensing element 10. The actuator 16 may comprise, without limitation, a motor with a gear and pulley. Actuator 16 is preferably suspended on a cable 19 by means of a biasing device, such as but not limited to, a spring suspension 20. The sensing device 18 may comprise, without limitation, two or more limit switches 22 and 24, which may control the direction in which actuator 16 pushes or pulls the tensing element 10. Limit switches 22 and 24 may or may not be placed close together.

In the equilibrium position, limit switches 22 and 24 may be normally open, wherein actuator 16 is in a holding position and the tension is constant. As the cover 14 contracts or retracts, it imparts a force on the tensing element 10, such as by means of (but not limited to) an elastic connecting member 26, e.g., a rubber belt. This force changes the relative position of the suspended actuator 16 with respect to the spring suspension 20. If the force is greater than the equilibrium force position (set by the spring mid position), one of the limit switches 22 or 24 turns on actuator 16 to reduce the tension until equilibrium is reached and actuator 16 stops ("not on" position). Conversely, if the force is less than the equilibrium force position (set by the spring mid position), the other limit switch turns on actuator 16 to reduce the tension until equilibrium is reached and actuator 16 stops ("not on" position).

Tensing element 10 may employ load cell or other electrical elements to measure the actuator load for the equilibrium position. Power may be supplied by a large power source, or by one or more batteries, such as an array of relatively inexpensive rechargeable batteries. Batteries may be charged by any electric power supply/charger or by solar panels. The invention may save power because no current is drawn from the power supply at the equilibrium position.

Tensing element 10 may be attached to supporting structure 12 via a ball joint 28. Ball joint 28 may be useful in indicating a malfunction in the system, such as a break in the cable 19 or elastic connecting member 26. If such a break occurs, the tensing element 10 swings downwards about ball joint 28. The displaced tensing element 10 may be easily detected by routine inspection and replaced or repaired.

The tensing system of the present invention has many other applications other than for open water reservoirs. For example, the active tensing system of the invention may be used for covers over landfills and sewage. Landfills and sewage that are covered create methane gas, which may be excavated and released from the cover. When under pressure from the gas, the cover inflates.

The active tensing system of the invention may sense when the cover is floating or is inflated. If the cover is floating, then the tensing element 10 functions as described hereinabove. That is, the tensing element 10 relaxes (decreases the tension) if the tension rises above some predefined amount (such as when the fluid level—in this case methane gas—goes down), and conversely increases the tension if the tension drops below some predefined amount (such as when the fluid level—in this case methane gas—goes up). If on the other hand the cover is inflated, the tensing element 10 may pull the cover, i.e., increase the tension until the cover is at some predefined height relative to tensing element 10, e.g., above the water, landfill or sewage. The sensing device 18 may comprise a height gauge that measures the height of the cover above the water, landfill or sewage, or alternatively may comprise a pressure gauge that measures the pressure of the fluid.

It will be appreciated by persons skilled in the art that the present invention is not limited by what has been particularly shown and described hereinabove. Rather the scope of the present invention includes both combinations and sub-combinations of the features described hereinabove as well as modifications and variations thereof which would occur to a person of skill in the art upon reading the foregoing description and which are not in the prior art.

What is claimed is:

1. Apparatus comprising:
    a tensing element connected at one end thereof to a supporting structure and at another end thereof to a cover, wherein movement of said cover imparts a force on said tensing element;
    an actuator adapted to move said tensing element; and
    a sensing device adapted to sense an equilibrium force position of said tensing element, wherein if said force changes the equilibrium force position said sensing device instructs said actuator to change a tension imparted by said tensing element on said cover.

2. Apparatus according to claim 1, wherein if said force is greater than the equilibrium force position said sensing device instructs said actuator to reduce tension imparted by said tensing element on said cover until equilibrium is reached, and conversely, if said force is less than the equilibrium force position said sensing device instructs said actuator to increase tension imparted by said tensing element on said cover until equilibrium is reached.

3. Apparatus according to claim 1, wherein said sensing device instructs said actuator to change the tension imparted by said tensing element on said cover until said cover is at a predefined height relative to said tensing element.

4. Apparatus according to claim 1, wherein said actuator is suspended on a cable by means of a biasing device.

5. Apparatus according to claim 4, wherein said force changes a position of said actuator relative to said biasing device.

6. Apparatus according to claim 1, wherein said sensing device comprises a plurality of limit switches.

7. Apparatus according to claim 1, wherein said cover comprises at least one of a floating cover and a geomembrane.

8. Apparatus according to claim 1, wherein said tensing element is connected to said cover by means of an elastic connecting member.

9. Apparatus according to claim 1, wherein said tensing element is connected to said supporting structure via a ball joint.

\* \* \* \* \*